United States Patent [19]

Kitagawa

[11] Patent Number: 5,187,518
[45] Date of Patent: Feb. 16, 1993

[54] PHOTOGRAPHIC FILMSTRIP

[75] Inventor: Kuniharu Kitagawa, Kanagawa, Japan

[73] Assignee: Fuji Photo Film Co., Ltd., Kanagawa, Japan

[21] Appl. No.: 757,353

[22] Filed: Sep. 10, 1991

[30] Foreign Application Priority Data

Sep. 10, 1990 [JP] Japan ................................ 2-240398

[51] Int. Cl.$^5$ ............................................ G03B 27/52
[52] U.S. Cl. ....................................... 355/40; 354/105
[58] Field of Search ................................ 355/40, 41; 354/105–109; 428/900

[56] References Cited

U.S. PATENT DOCUMENTS 5,006,422  4/1991  Sakurai et al. ...................... 428/900

FOREIGN PATENT DOCUMENTS

WO9004205  4/1990  European Pat. Off. .

Primary Examiner—Michael L. Gellner
Assistant Examiner—D. Rutledge
Attorney, Agent, or Firm—Sughrue, Mion, Zinn, Macpeak & Seas

[57] ABSTRACT

A photographic filmstrip having a first recording area coated with transparent magnetic material superimposed on each frame and a second magnetic recording area coated with transparent magnetic material at a position outside of each frame. The border of the second recording area is pre-exposed so as to render the border visible by a developing process.

13 Claims, 3 Drawing Sheets

PHOTOGRAPHIC FILMSTRIP

BACKGROUND OF THE INVENTION

The present invention relates to a photographic filmstrip. In particular, the present invention is a photographic filmstrip having magnetic recording areas on which various information is recorded.

DESCRIPTION OF THE RELATED ART

International Publication WO 90/04205 discloses a photographic filmstrip (hereafter referred to as a film) having magnetic recording areas coated with transparent magnetic material on one side of the film. Film information is recorded on these magnetic recording areas when manufacturing the film. This information represents, for example, the type of film, the sensitivity of the film, the number of frames, photographic information recorded during photographing, print information recorded during printing, and other information.

The above-described magnetic recording area is light transparent so as to avoid optically adverse effects when photographing and printing. Accordingly, the magnetic recording area of the developed film cannot be visually detected. Therefore, the magnetic area of a developed film returned to the user is likely to be inadvertently scratched or cut. This is so because, after printing a developed film, it is cut into film pieces each having a predetermined number of frames. In such a case, the film is likely to be cut traversing the magnetic recording area.

SUMMARY OF THE INVENTION

It is therefore a principal object of the present invention to provide a film whose magnetic recording areas can be visually recognized so that they are not inadvertently scratched or cut.

The above and other objects can be achieved by the present invention in which magnetic recording areas other than imaging areas can be visually recognized. Such visual indication is realized by recording a contour line or corner marks of each magnetic recording area. Color or density change may be used for such visual indication. The above-mentioned visual indication may be made so as to be visible after a developing process.

According to the present invention, a magnetic recording area can be visually recognized so that the problem of inadvertent scratching or cutting of the magnetic recording area is eliminated. Information recorded on the magnetic recording area can be maintained reliably, thus improving the quality of additional photoprints and increasing process efficiency.

BRIEF DESCRIPTION OF THE DRAWINGS

The above-mentioned objects and advantages of the present invention will become more apparent from the following detailed description when read in connection with the accompanying drawings, in which.

DETAILED DESCRIPTION OF THE PREFERRED EMBODIMENTS

Figure 1:
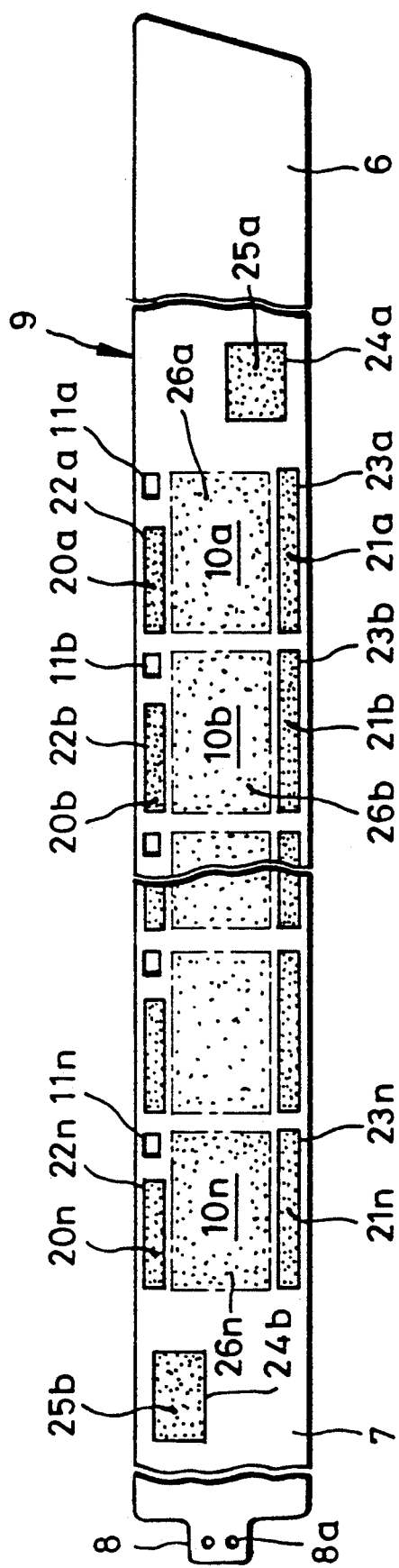
FIG. 1 is a plan view of a film according to the first preferred embodiment of the present invention.

Referring to FIG. 1, photographic film 9 is contained within a light-tight cassette (not shown) being wound on a spool (also not shown), as is well known in the art. Tongue 8 is provided at trailer 7 of film 9, with two holes 8a being formed therein. The two holes 8a are engaged with claws formed on the spool within its slit so that film trailer 7 is fixedly connected to the spool. Leader 6 of film 9 is completely contained within the cassette, and is advanced externally of the cassette via its film passage by rotating the spool. Perforations 11a to 11n are formed in film 9 at a predetermined pitch. Each perforation 11a to 11n is detected by a sensor so as to allow the camera advance mechanism to advance the film by one frame. An image is taken on an imaging area of each frame 10a to 10n at a proper position.

Figure 2:
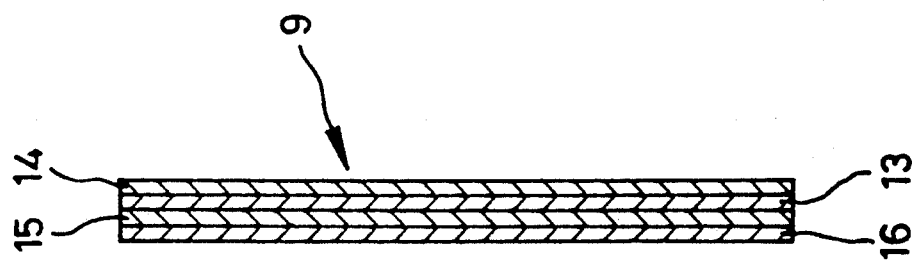
FIG. 2 is a cross sectional view of the film shown in FIG. 1.

As shown in FIG. 2, film 9 has base 13, on one side of which photosensitive emulsion layer 14 is formed, and on the other side of which transparent magnetic recording layer 15 is formed. On magnetic recording layer 15, there is formed protective layer 16. In order to make magnetic recording layer 15 transparent, a small amount of magnetic powder added to a binder is applied as a thin layer, or simultaneously co-extruded with the formation of base 13.

Figure 3:
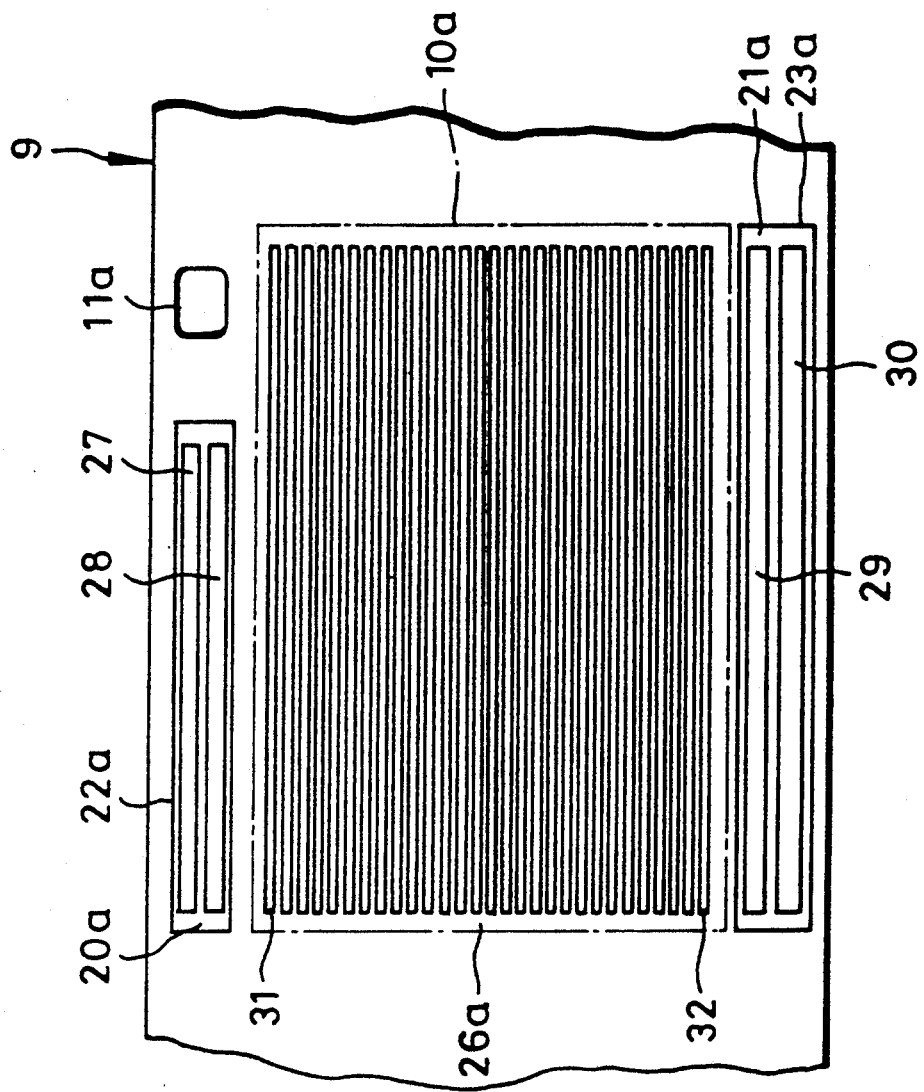
FIG. 3 is an enlarged plan view of the first frame of the film shown in FIG. 1.

FIG. 3 illustrates the magnetic recording area including a frame area, and upper and lower areas of the frame area. For example, first frame 10a has magnetic recording area 26a formed superimposed on frame 10a, and rectangular magnetic recording areas 20a and 21a positioned proximate upper and lower portions of frame 10a. Magnetic recording areas 20a and 21a are used for recording photographing information, and magnetic recording area 26a is used for recording print information. Magnetic recording areas 20a and 21a are provided with visual indications. In this embodiment, contour line 22a is photographically recorded as a latent image when film 9 is manufactured, so as to indicate the contour of recording areas 20a and 21a. After a developing process, contour line 22a is visible. Similar visual indications are provided for other frames 10b to 10n. Recording areas 25a and 25b are provided for film leader 6 and film trailer 7 (See FIG. 1). Similar contour lines 24a and 24b are pre-exposed for recording areas 25a and 25b. Recording areas 25a and 25b are used for recording user identification information.

A cassette containing film 9 is loaded within a camera for photographing. As the spool of the film cassette is rotated, film leader 6 is advanced out of the cassette and transported toward a film take-up chamber. Film leader 6 is caught by the outer periphery of a take-up spool rotating within the film take-up chamber. When film leader 6 is caught by the take-up spool, the initial film advancement is terminated. Unexposed film 9 is pulled out of the cassette by the take-up spool so as to transport first frame 10a to the exposure position. During film transport, when a sensor detects perforation 11a, the film transport is stopped and first frame 10a is located at the exposure position.

After photographing a subject for first frame 10a, film 9 is advanced by one frame so as to locate second frame 10b at the exposure position. During this one frame advancement, exposure information relating to first frame 10a is magnetically recorded in recording areas 20a and 21a by two recording heads disposed within the camera along the film passageway. Examples of exposure information are subject brightness, aperture setting, shutter speed, date of exposure, time of exposure, subject distance, type of light source, print format, and the like. For example, if a camera has a four-channel recording system, exposure information is recorded on first to fourth tracks 27 to 30 as shown in FIG. 3.

After exposure, exposed film 9 is completely rewound into the cassette, with film leader 6 being contained within the cassette. After rewinding, the cassette containing exposed film 9 is removed from the camera. The cassette is then forwarded to a laboratory for development. At the laboratory, exposed film 9 is removed from the cassette and developed using a film processor. After the developing process, each of frame image and contour lines 22a, 23a, 24a, and 24b are visible.

Developed film 9 is subsequently sent to a photographic printer for printing of each frame image on color paper. During printing, print information is magnetically recorded on transparent recording areas 26a superimposed upon respective frames. This print information includes, for example, the exposure amount of each color, information relating to a request of printing, correction modes, and the like. For example, print information for first frame 10a is magnetically recorded on recording area 26a while film 9 is transported after printing first frame 10a. If a photographic printer has a 30-channel recording system for example, print information is recorded on a first track 31 to a thirtieth track 32. After all frames 10a through 10n are printed, user identification information, or the like, is recorded on recording area 25a or 25b. The print information recorded on recording area 26a is read when additional photoprints are printed, so that these photoprints have the same color balance and density as those initially printed at the time of development.

Printed film 9 is then cut into negative film pieces each having six frames, for example. A plurality of the negative pieces are inserted into film sheaths. The film pieces and photoprints are then returned to the user. During the film cutting operation, it is easy to avoid cutting recording areas 25a and 25b because contour lines 24a and 24b are visible for marking recording areas 25a and 25b. Furthermore, for example, contour lines 22a and 23a are visible for marking recording areas 20a and 21a of first frame 10a, so that recording areas 20a and 21a will not be inadvertently scratched or cut by a user. A contour line may also be recorded for recording area 26a superimposed on its frame if desired.

In the above-mentioned embodiment, film leader 6 is completely contained within the cassette, so that recording area 25a will not be exposed by external light before development and contour line 24a, which has been pre-exposed, will not be extinguished. In the case of a film cassette of the type now commercially available, part of the film leader initially protrudes out of the cassette, it is preferable to make the film leader longer and form recording area 25a at a position initially located inside the cassette.

Figure 4:
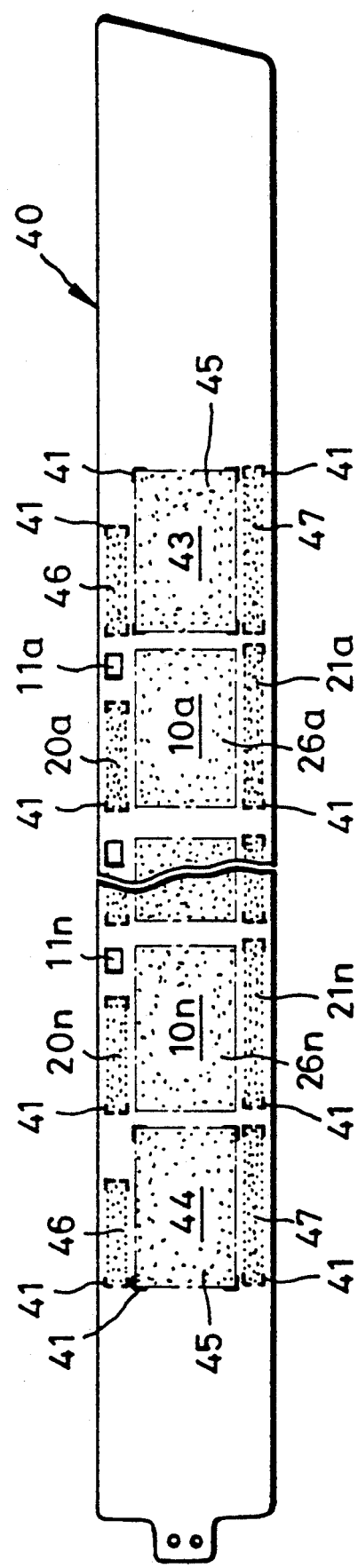
FIGS. 4 and 5 are plan views of films having other visual indications for magnetic recording areas according to other embodiments of the present invention.

FIG. 4 shows a second embodiment of the present invention. Film 40 of this embodiment has L-shaped corner marks 41 at all four corners of each recording area. These corner marks 41 are pre-exposed and recorded as latent images. There is an occasion on which first frame 10a may be used not first, but rather, second for exposure, depending upon the film transport mechanism of a camera, e.g. one having a frame-by-frame transportation that positions the film by metering a film transporting amount. In view of this, in this embodiment, additional frames 43 and 44 are provided before first frame 10a and after last frame 10n. Additional frames 43 and 44 also have corner marks 41 pre-exposed and recorded as latent images. Recording areas 45-47 are provided also for additional frames 43 and 44. Corner marks 41 are recorded on the recording areas 45 to 47 of additional frames 43 and 44.

Figure 5:
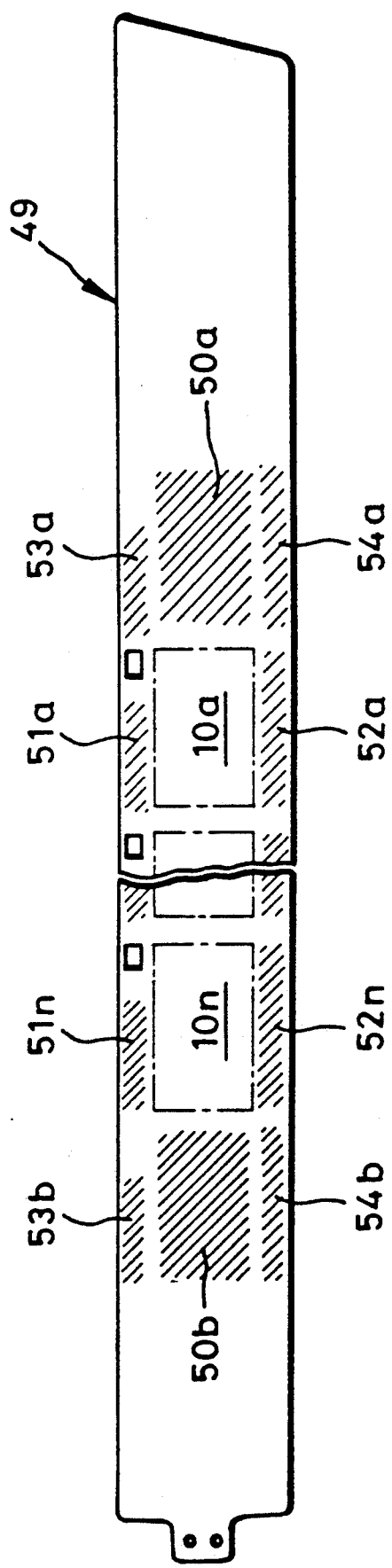

FIG. 5 illustrates film 49 having recording areas pre-exposed for visual recognition. In this embodiment, the entire areas of recording areas 51a to 51n and 52a to 52n are pre-exposed with the exception of the recording areas superimposed upon respective frames 10a to 10n. Recording areas 50a and 50b are also provided and pre-exposed before first frame 10a and after last frame 10n. Since the recording areas that are pre-exposed have a high optical density after developing, these recording areas can be correctly discriminated. Since the entirety of recording areas are rendered visible, a weak pre-exposure may be effected.

In the above-mentioned embodiments, the magnetic recording layer is formed over the whole area of one side of base 13, and the recording areas used for magnetic recording are rendered visible. Alternatively, the magnetic recording layer may be formed only on the areas where recording areas are formed, by coating magnetic material in a desired pattern. In the case of a color film, recording areas are preferably indicated by using a color different from the base color, particularly a complementary color. Furthermore, while coating an imaging area with transparent magnetic material, areas other than the imaging area may be coated with a colored magnetic material, or magnetic material having a density higher than the base under a dry condition. The transparent recording area superimposed upon an imaging area may, of course, be omitted.

Although the present invention has been fully described by way of the preferred embodiments thereof with reference to the accompanying drawings, various changes and modifications will be apparent to those of ordinary skill in this field without departing from the scope of the present invention, as recited in the appended claims.

What is claimed is:

1. A photographic filmstrip in which a photosensitive emulsion layer is formed on a first side of a base, and a plurality of images are sequentially taken on a plurality of frames defined on the photosensitive emulsion layer, comprising:
    a plurality of first recording areas positioned outside of each of said frames, information being magnetically recorded on at least one of said first recording areas; and
    indicating means for allowing visual recognition of each of said first recording areas.

2. A photographic filmstrip as claimed in claim 1, further comprising a positioning perforation formed in the filmstrip corresponding to each of said frames.

3. A photographic filmstrip as claimed in claim 1, wherein each of said first recording areas is formed on a second side, of said base, that is opposite said first side.

4. A photographic filmstrip as claimed in claim 3, further comprising a plurality of optically transparent second recording areas on which information is magnetically recorded, each of said second recording areas being superimposed upon one of said frames.

5. A photographic filmstrip as claimed in claim 4, wherein each of said first recording areas has one of optical density and color that is different from that of said base.

6. A photographic filmstrip as claimed in claim 4, wherein each of said first recording areas is optically transparent.

7. A photographic filmstrip as claimed in claim 6, wherein an outer periphery of each of said first and second recording areas defines a rectangle.

8. A photographic filmstrip as claimed in claim 7, wherein a contour line is recorded as a latent image, said contour line surrounds an outer periphery of said rectangle, said contour line being transformed into a visual image by a developing process.

9. A photographic filmstrip as claimed in claim 7, wherein L-character shaped corner marks are recorded as latent images at corners of said rectangle defined by second recording areas said corner marks being transformed into a visual image by a developing process.

10. A photographic filmstrip as claimed in claim 7, wherein the entirety of said rectangles defined by said first recording area, is pre-exposed so as to be visible after a developing process.

11. A photographic filmstrip in which a photosensitive emulsion layer is formed on a first side of a base, and a plurality of images is taken on a plurality of frames defined on the photosensitive emulsion layer at predetermined intervals, comprising:

a plurality of first magnetic recording areas positioned outside of each of said frames, said first magnetic recording areas being coated with a transparent magnetic material, a border portion of each of said first recording areas being exposed so as to render said border portion visible by a developing process;

a plurality of second magnetic recording areas coated with transparent magnetic material and superimposed upon each of said frames; and a positioning perforation formed on the filmstrip corresponding to each of said frames.

12. A photographic filmstrip as claimed in claim 11, wherein said first and second magnetic recording areas are formed on a second side of said base that is opposite said first side.

13. A photographic filmstrip as claimed in claim 12, further comprising:

transparent third and fourth magnetic recording areas formed respectively on a leader portion and a trailer portion of the filmstrip, a border portion of each of said third and fourth magnetic recording areas being exposed so as to render said border portion visible by a developing process.

* * * * *